United States Patent [19]
Koizumi et al.

[11] Patent Number: 5,124,863
[45] Date of Patent: Jun. 23, 1992

[54] DISK DRIVE DEVICE HAVING REDUCED THICKNESS

[75] Inventors: Shigeki Koizumi; Yasuaki Imai, both of Saitama, Japan

[73] Assignee: Canon Denshi Kabushiki Kaisha, Chichibu, Japan

[21] Appl. No.: 543,106

[22] Filed: Jun. 25, 1990

[30] Foreign Application Priority Data

| Jun. 27, 1989 | [JP] | Japan | 1-162524 |
| Jun. 27, 1989 | [JP] | Japan | 1-162525 |
| Jun. 27, 1989 | [JP] | Japan | 1-162526 |
| Sep. 12, 1989 | [JP] | Japan | 1-234802 |
| Sep. 12, 1989 | [JP] | Japan | 1-234803 |
| Nov. 1, 1989 | [JP] | Japan | 1-283092 |

[51] Int. Cl.⁵ ............................................. G11B 17/02
[52] U.S. Cl. ................................................. 360/99.08
[58] Field of Search ............... 360/99.08, 99.04, 99.05, 360/99.11, 99.12

[56] References Cited

U.S. PATENT DOCUMENTS

| 4,275,426 | 6/1981 | Hoffman | 360/99.04 |
| 4,359,763 | 11/1982 | Hoffman | 360/99.04 |
| 4,841,393 | 6/1989 | MacLeod et al. | 360/99.04 |
| 4,887,175 | 12/1989 | Hoshi | 360/99.04 |
| 5,038,240 | 8/1991 | Isomura | 360/99.04 |

*Primary Examiner*—Robert S. Tupper
*Attorney, Agent, or Firm*—Spencer, Frank & Schneider

[57] ABSTRACT

A disk drive system in accordance with the present invention comprises a surface opposing type spindle motor which in turn comprises a spindle which is rotatably supported through a bearing by a chassis and to which is to be mounted a disk, a rotor yoke securely attached to the spindle, a driving magnet assembly, a printed-circuit board upon which are mounted a plurality of driving coils and a stator yoke disposed in opposing relationship with the driving magnet through the driving coils. A chassis has an opening in which is housed a head and the stator yoke is formed with a first recess in a region corresponding to a space in which the head is displaced. The bearing is a radial bearing having a diameter greater than that of the spindle. In order to avoid the interference between the driving coils and the first recess, the driving coils are disposed in an opening formed through the printed-circuit board or the space defined at the position corresponding to the recess. Furthermore, in order to balance the attractive forces of the driving magnet assembly or to cancel the cogging torque, the stator has a second recess at a position in opposing relationship with the first recess across the bearing.

25 Claims, 16 Drawing Sheets

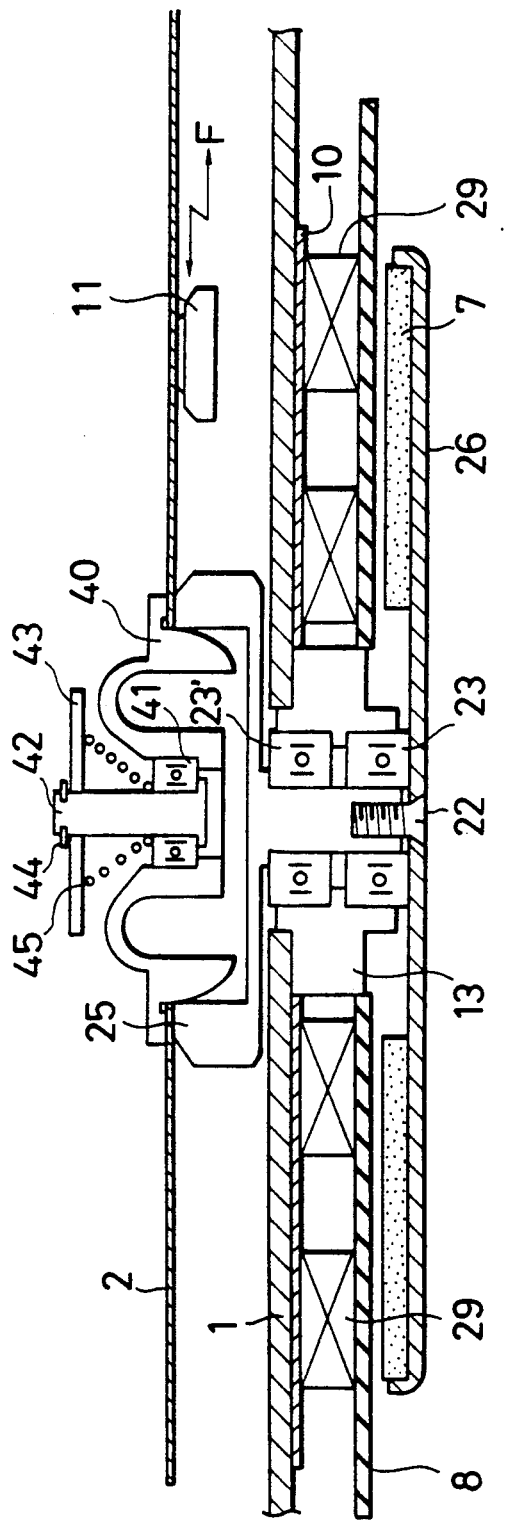
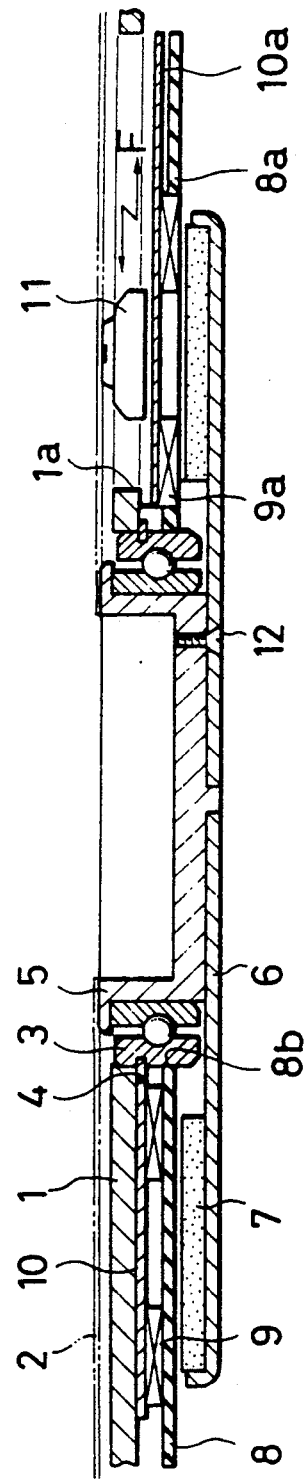

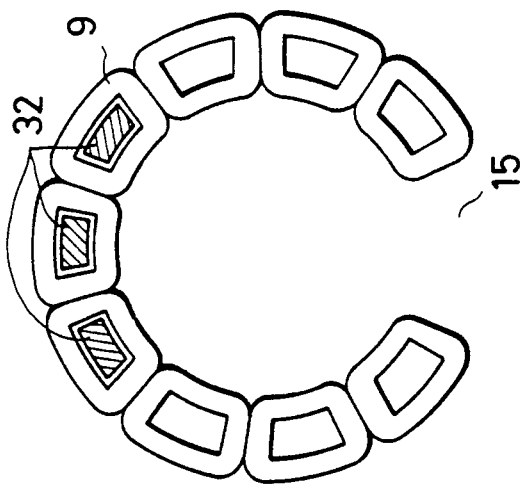
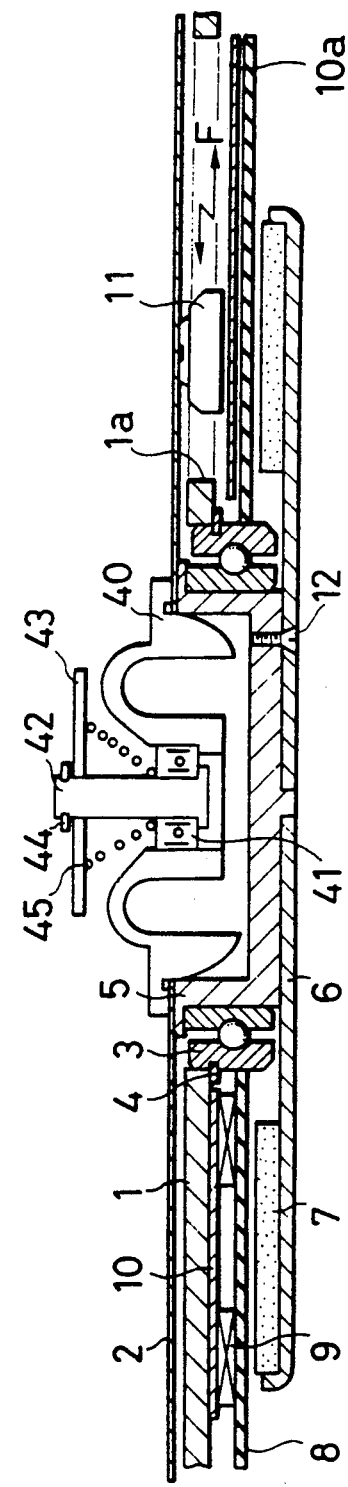
FIG. 9
FIG. 10

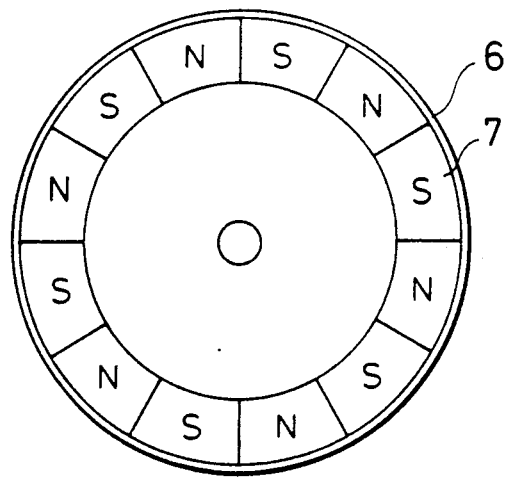
F I G .13
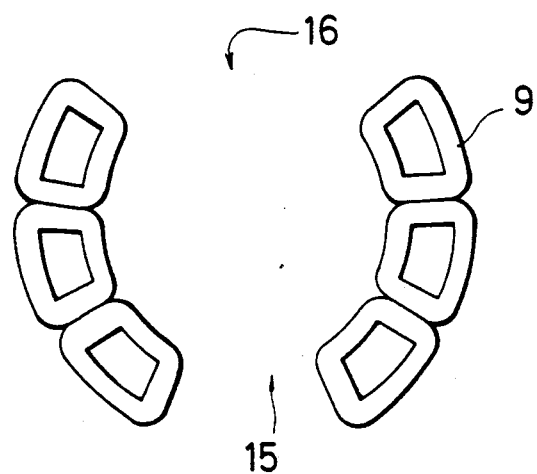
F I G .14
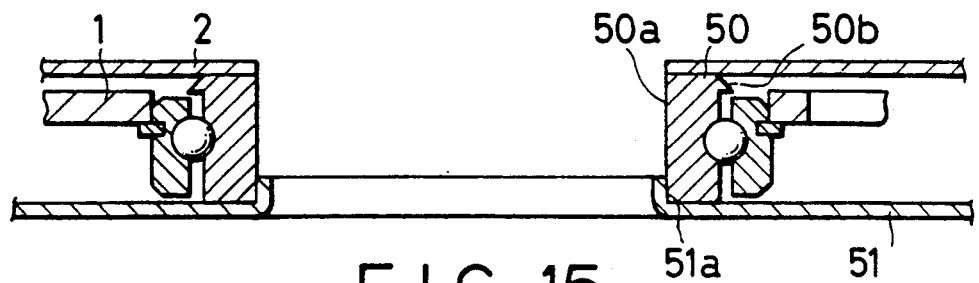
F I G .15

DISK DRIVE DEVICE HAVING REDUCED THICKNESS

BACKGROUND OF THE INVENTION

1. Field of the Invention

The present invention relates to a disk drive device for rotating a disk-shaped recording medium such as floppy disks.

2. Description of the Prior Art

FIG. 1 is a sectional view illustrating a spindle motor portion which is one of the major component parts of a conventional floppy disk drive (to be referred as "FDD" in this specification hereinafter). Reference numeral 1 respesents a chassis or a main body base made by the aluminum die casting process or the press; 2, a disk the surface of which the data is written and read out, and 23, 23', bearings for supporting a spindle 25 which supports and rotates the disk 2.

The disk 2 is cramped on the spindle 25 by a center cone 40. 41 indicates a bearing; 42, a center shaft which is securely carried by a pressure plate 43 by a retaining ring 44. 45 is a spring for transmitting the clamping force from the pressure plate 43 to the center cone through the bearing 41. 26 is a rotor or which driving magnets 7 are securely attached.

8 is a printed circuit board for a motor for rotating a disk. 29 are driving coils arranged in the circumferential direction and in equidistantly spaced apart and coplanar copartner relationship with each other, and the rotating force produced by using the electromagnetic conversion force produced by a conventional current switching method is imparted to the driving magnetic. 10 is a stator yoke and establishes the closed magnetic circuit together with the driving magnets 7. 11 is a magnetic head for writing and reading the data on and off from the surface of the disk 2 which is securely connected to a head carriage (not shown) so that the magnetic head can move in the directions indicated by the double pointed arrow F.

22 is a setscrew for securely attaching the rotor 26 to the spindle 25. 13 is a housing for securely holding the bearings 23 and 23' which is securely mounted on the chassis 1.

The conventional FDD of the type described above has the following problems.

(1) In the bearing assembly, the spindle 25, the bearings 23 and 23' and the rotor 26 are superposed so that the reduction in thickness of the bearing assembly is limited.

(2) The thickness of the magnetic head 11 is added to that of the motor so that the reduction in overall thickness is also limited.

SUMMARY OF THE INVENTION

The primary object of the present invention is therefore to provide a disk drive device which can be made compact in size by absorbing the overall thickness of the motor and the magnetic head by suitable design and construction of another parts.

Another object of the present invention is to provide a disk drive device in which the balance of attractive forces of the driving magnets can be improved and which can be made thinner by suitable design and construction.

A further object of the present invention is to provide a disk drive system in which torgue ripple due to occurrence of cogging torgue can be suppressed to a minimum so that precision of rotation can be improved and vibration sound can be reduced.

In the firest aspect of the present invention, a disk drive device of the type comprises:

a spindle rotatably supported by a chassis on which is to be mounted a disk;

a head disposed on the chassis so as to be movable in the radial direction of the disk;

a rotor yoke securely mounted on the spindle and securely carrying a disk-shaped driving magnet assembly;

a printed-circuit board disposed in opposing relationship with the driving magnet assembly and provided with a plurality of driving coils; and a stator yoke mounted on the chassis in opposing relationship with the driving magnet assembly through the plurality of driving coils, wherein the chassis has an opening for housing therein the head;

the stator yoke has a recess in a portion corressponding to a region in which the head is displaced;

the printed circuit board has an opening in opposing relationship with the recess; and at least one driving coil is disposed in the opening.

Here, the bearing may be a radial bearing whose inner diameter is greater than that of the spindle and the spindle is fitted into an opening defined by the inner ring of the radial bearing.

The recess may be a rectangular groove formed by the drawing operation and having the same width throughout the whole length of the groove.

In the second aspect of the present invention, a disk drive device disposing a surface opposing type spindle motor comprises:

a spindle rotatably supported through a radial bearing by a chassis on which is to be mounted a disk;

a rotor yoke securely attached to the spindle;

a driving magnet assembly;

a plurality of driving coils disposed in opposing relationship with driving magnet assembly; and a stator yoke, being in opposing relationship with the driving magnet assembly, sandwiching the plurality of the driving coils therebetween; wherein the improvement comprises the bearing being a radial bearing having an inner diameter greater than the diameter of the spindle and the spindle being fitted into the hole defined by the inner ring of the radial bearing.

Here, the following relationship may be satisfied, $$D_r \geq D$$

Where
$D$ is an inner diameter of the disk and
$D_r$ is a diameter of a raceway surface of an inner ring of the radial bearing.

The following relationship may be satisfied, $D_B <$ a diameter of an innermost track of the disk, where $D_B$ is a diameter of the outer ring of the radial bearing.

The following relationship may be satisfied, $$H \leq 6 \text{ mm}$$

where $H$ is a height from the center of a bearing ball of the radial bearing to a disk mounting surface of the spindle.

A spindle which is made of a plastic mixed with at least a metal selected from the group consisting of aluminum, an aluminum alloy, stainless steel, brass, zinc and a zinc alloy and filter and which has a low coefficient of thermal expansion, may be securely fitted into an inner hole defined by an inner ring of the radial bearing.

In the third aspect of the present invention, a disk drive device of the type having a spindle rotatably supported by a chassis on which is to be mounted a disk, a head disposed on the chassis so as to be movable in the radial direction of the disk, a rotary yoke securely mounted on the spindle and securely carrying a circular driving magnet assembly, a plurality of driving coils disposed in opposing relationship with the circular driving magnet assembly, and a stator yoke disposed on the chassis in opposing relationship with the circular driving magnet assembly through the plurality of driving coils; wherein the improvement comprises:

the chassis having an opening in which the head is housed;

the stator yoke having a recess in a portion corresponding to a region in which the head is displaced;

satisfying the condition $P=4n+2$, where P being the number of magnetized poles of the circular driving magnet assembly and 3n (n: plus integers) being the number of the driving magnetic coils; and the plurality of driving coils being arranged in the form of a circle leaving a space corresponding to the recess of the stator yoke.

Here, the bearing may be a radial bearing whose inner diameter is greater than that of the spindle and the spindle is fitted into an opening defined by the inner ring of the radial bearing.

The recess may be a rectangular groove formed by the drawing operation by the mechanical press and having the same width throughout the whole length of the groove.

In the fourth aspect of the present invention, a disk drive device of the type having a spindle which is rotatably supported through a bearing on a chassis and over which is mounted a disk;

a head disposed on the chassis so as to be movable in the radial direction of the disk;

a rotor yoke which is securely attached to the spindle and to which is attached a circular driving magnet ring;

a plaurality of driving coils disposed in opposing relationship with the circular driving magnet assembly; and a stator yoke disposed on the chassis in opposing relationship with the circular driving magnet assembly through the plurality of driving coils; wherein the improvement comprises:

the chassis having an opening in which the head is housed;

the stator yoke having a recess in a portion corresponding to a region in which the head is displaced; and means, disposed at a position in opposing relationship with the recess across the bearing, for balancing attractive forces of the circular driving magnet assembly acting on the stator yoke.

Here, the balancing means may comprise another yoke member disposed within spaces of the driving coils.

The balancing means may be a second recess formed by the drawing operation.

The second recess may be extended into an inside space of one of the plurality of driving coils.

In the fifth aspect of the present invention, a disk drive device disposing a surface opposing type spindle motor comprises:

a spindle rotatably supported through a radial bearing on a chassis and upon which is placed a disk;

a rotor yoke securely attached to the spindle;

a driving magnet assembly;

a plurality of driving coils disposed in opposing relationship with the driving magnet assembly; and a stator yoke disposed in opposing relationship with the driving magnet assembly with the plurality of driving coils sandwiched therebetween; wherein the improvement comprises:

the bearing being a radial bearing having an inner diameter greater than the diameter of the spindle and the spindle being fitted into the hole defined by the inner ring of the radial bearing.

In the sixth aspect of the present invention, a disk drive device of the type having a spindle rotatably supported by a chassis on which is to be mounted a disk, a head disposed on the chassis so as to be movable in the radial direction of the disk, a rotary yoke securely mounted on the spindle and securely carrying a circular driving magnet assembly, a plurality of driving coils disposed in opposing relationship with the circular driving magnet assembly, and a stator yoke disposed on the chassis in opposing relationship with the circular driving magnet assembly through the plurality of driving coils; wherein the improvement comprises:

the chassis having an opening in which the head is housed; and the stator yoke having a first recess formed in a portion corresponding to a region in which the head is displaced and a second recess formed as as to cancel the cogging torque produced by the first recess.

Here, the driving magnet assembly may be equiangularly divided by a predetermined angle $\theta_o$ into an even number of alternately magnetized poles defined by driving by $\theta$ are positively and negatively;

the first and second recesses of the stator yoke are substantially in the form of a rectangle and are extend in different radial directions, respectively, of the stator; and the side edges of the recesses extending outwardly of the stator yoke are not in parallel with boundary lines of the poles of the driving magnet assembly, when the side edges and the boundary lines become in opposing relationship, by viewing from a point of a line perpendicular to the surface of the stator yoke.

An even number of poles defined by equiangularly dividing the circular driving magnet assembly by $\theta$ may be alternately positively and negatively magnetized;

the first and second recesses of the stator yoke are substantially in the form of a rectangle and are exended in the different radial directions, respectively, of the stator; and an angle between the first and second recesses is substantially equal to $(n+\alpha)$ times the predetermined angle $\theta_o$, wherein n is 0 or an integer, and $\alpha$ is $\frac{1}{4}$, $\frac{1}{2}$ or $\frac{3}{4}$.

The angle between the first and second recesses may be 180 degrees plus $\frac{1}{4}$ or $\frac{1}{2}$ or $\frac{3}{4}$ of the angle $\theta$ or is 180 degrees minus $\frac{1}{4}$ or $\frac{1}{2}$ or $\frac{3}{4}$ of the angle $\theta_o$.

The plurality of driving coils may consist of a predetermined number of first driving coils and a predetermined number of second driving coils which are different in size from the first driving coils, each pair of the first and second coils being in the same phase; and the first and second driving coils are so interconnected that output torque in each phase becomes equal.

The plurality of driving coils may be arranged in the form of a circle leaving spaces so as not to interfere with the first and second recesses of the stator yoke, whereby the first and second recesses are positioned within the spaces, respectively.

The above and other objects, effects, features and advantages of the present invention will become more apparent from the following description of embodiments thereof taken in conjunction with the accompanying drawings.

BRIEF DESCRIPTION OF THE DRAWINGS

FIG. 1 is a schematic side sectional view illustrating a disk driving motor and its associated parts of a conventional FDD;

FIG. 2 is a side sectional view showing an embodiment of a disk driving system in accordance with the present invention;

FIG. 9 is a top view showing an arrangement of the driving coils;

FIG. 10 is a side sectional view taken along the line X—Y of FIG. 12, showing an embodiment of the present invention which is applied to 5.25" FDD;

FIG. 13 is a top view illustrating the magnetization mode of the magnet in the embodiment shown in FIG. 10;

FIG. 14 is a top view illustrating an arrangement of driving coils in the embodiment of FIG. 10;

FIG. 15 is a longitudinal sectional view showing another embodiment of the present invention in which the inner ring of the bearing is used as a spindle;

DETAILED DESCRIPTION OF PREFERRED EMBODIMENTS

Figure 3:
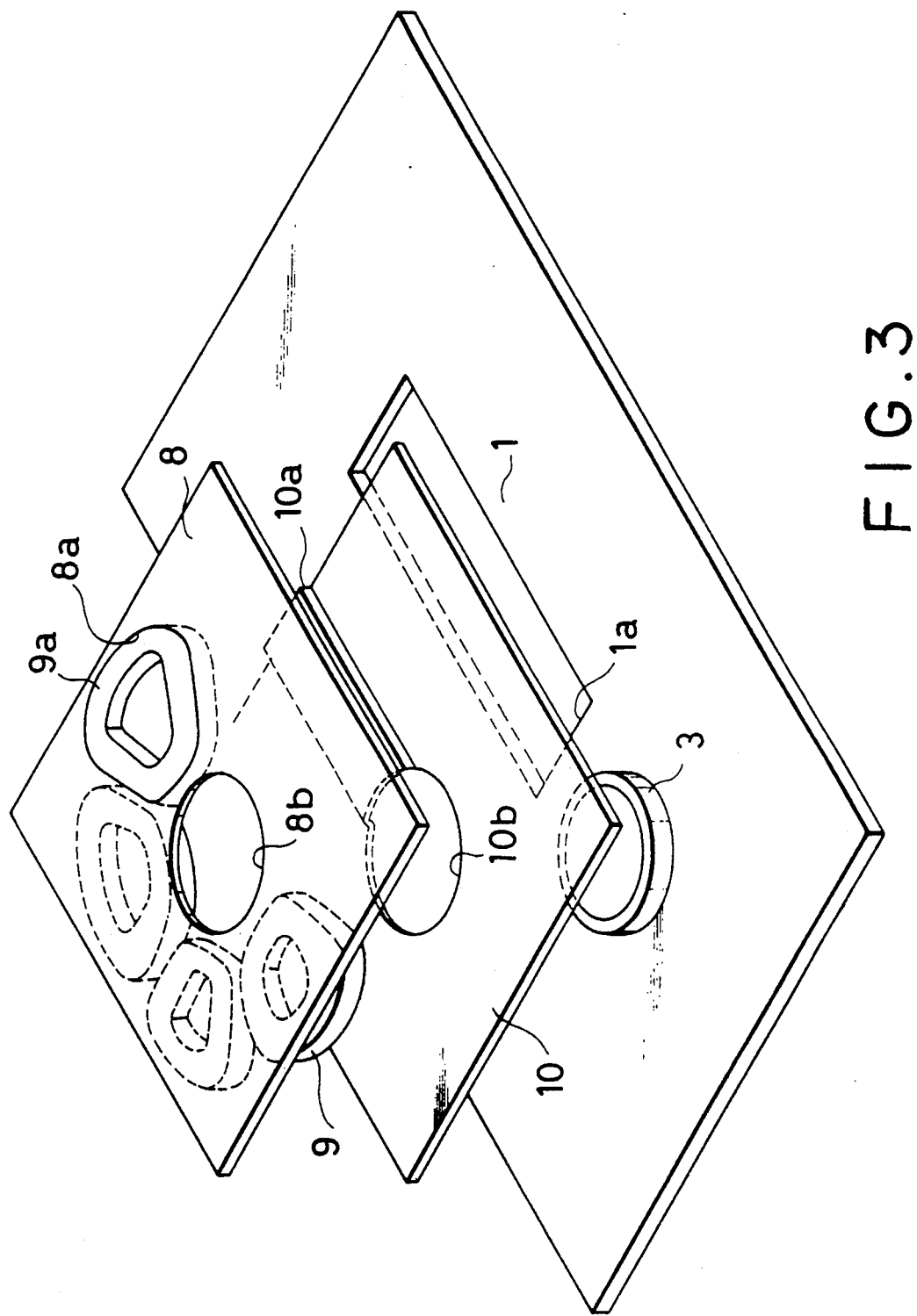
FIG. 3 is a schematic exploded perspective view, viewed from the bottom of the embodiment in FIG. 2, with parts of the driving coils not shown for the sake of easy understanding of the present invention.

Referring first to FIGS. 2 and 3, an embodiment of the present invention will be described.

Reference numeral 2 indicates a disk 2 or a recording medium and a magnetic head 11 carried by a head carriage (not shown) makes sliding contact with the surface of the disk 2 to write and read the data onto and out of the surface thereof.

A chassis 1 or a main body base of an FDD is made by aluminum die casting or a suitable press machine. A large-diameter radial bearing 3 is securely attached to the chassis 1 by a retaining ring 4 and an elongated opening 1a is formed through the chassis 1 so that a space for permitting the displacement of the magnetic head 11 is obtained. A spindle 5 is securely fitted into the inner ring or race of a bearing 3. The disk 2 is securely clamped over the surface of the spindle 5 by the center cone 40 which constitutes a clamping means shown in FIG. 1.

Figure 5:
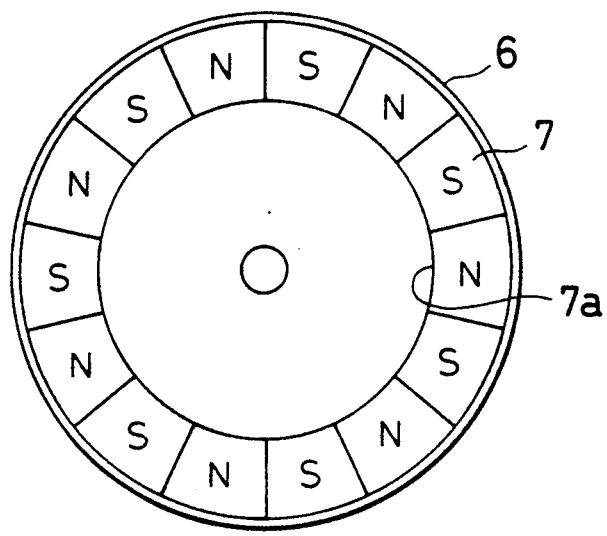
FIG. 5 is a top view showing the magnetization state of driving magnets.

A disk-shaped rotor yoke (to be referred to as "a rotor" in this specification hereinafter) 6 is securely connected to the lower surface of the spindle 5 by one or more setscrews 12. Driving magnets 7 are securely mounted on the upper surface of the rotor 6. As shown in FIG. 5, the driving magnets 7 are arranged in the form of a circular ring, defining a hole 7a coaxially of the magnets 7. Even numbers of regions obtained by equiangularly dividing the magnet ring 7 in the form of a 360-degree ring are alternately polarized by different magnetic poles. Because of the magnetic forces of the driving magnets 7, upward forces are imparted to the rotor 6 so that the bearing 3 is subjected to the previous pressurization.

A printed-circuit board 8 has control circuits for controlling the rotation of the disk drive motor and is formed with a hole 8b the center portion of the printed-circuit board 8 through which is extended the bearing 3. The printed-circuit board 8 is fixed to the chassis 1 in parallel and opposing relationship with the driving magnet ring 7. And they are spaced apart from each other by a predetermined distance. Driving coils 9 are securely mounted on the printed-circuit board 8 as will be described in detail hereinafter. A stator yoke (to be referred to as a stator hereinafter) 10 is disposed above the driving coils 9. More specifically, the stator 10 is securely attached to the chassis 1 in parallel with the driving magnet ring 7 so that the driving coils 9 are sandwiched between them. The stator 10 and the rotor 6 construct the magnetic circuit of the driving magnets 7.

The spindle motor with the above-described construction is a DC brushless three-phase Hall motor in which the driving magnets and the driving coils are in opposing relationship in a horizontal plane.

As shown in FIG. 3, the stator 10 is in the form of a rectangle or a disk and is formed at the center portin thereof a hole 10b through which is extended the bearing 3. In addition, it is formed with a rectangular recess 10a extended in the radial direction by the reduction method so as to permit the displacement of the magnetic head 11 in the directions indicated by the double pointed arrow F, shown in FIG. 2. That is, the magnetic head 11 is displaced in the recess 10a in the directions indicated by the double pointed arrow F; that is in the radial direction of the disk 2.

But there is no space to dispose the driving coil 9 at the recess 10 between the printed-circuit board 8 and the stator 10 so that according to the first embodiment of the present invention, the driving coils 9 are arranged as shown in FIG. 3. The printed-circuit board 8 is formed with an opening 8a corresponding to the recess 10a and one of the driving coils 9 is disposed as indicated by 9a, which are securely bonded by an adhesive or the like to the printed-circuit board 8 or the stator 10.

In FIG. 3, the driving coils 9 (or 9a) are shown (two coils are not shown for the sake of simplicity of the figure) as a three-phase drive with six driving coils, but the three-phase drive with nine driving coils may be also used in the present invention.

Figure 4:
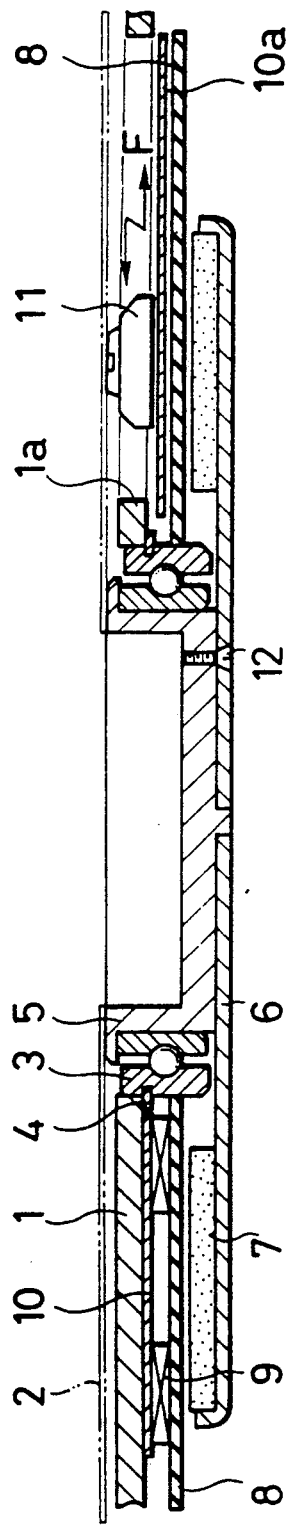
FIG. 4 is a side sectional view showing another embodiment of the present invention.
Figure 6:
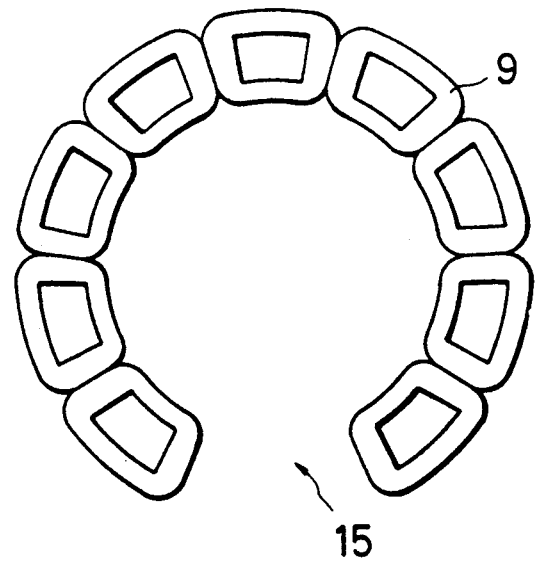
FIG. 6 is a top view showing the arrangement of driving coils.

But according to the present invention, the disposition of the driving coil in the region of the recess 10a may be omitted as shown in FIGS. 4-6. That is, the driving magnet assembly 7 consists of 14 magnetic poles (4 poles $\times$ 3 + 2 poles as shown in FIG. 5 and 9 driving coils ($3\times 3$ phases) as shown in FIG. 6. In this case, in order to avoid the disposition of the driving coils 9 in the region of the recess 10a of the stator 10, an arcuate space corresponding to that in which two magnetic poles could be located is defined as indicated by 15. Therefore, the recess 10a of the stator 10 is positioned in the space 15. In the latter case, it is not needed to form an opening in the printed-circuit board 8.

Thus, by switching energization and de-energization of the driving coils in a conventional three phase full-wave driving method, the rotor 6 is rotated by the magnetic force between the driving coils 9 and the driving magnets 7, whereby the spindle 5 and hence the disk are rotated. The magnetic head 11 makes sliding contact with the surface of the disk to write and read the data onto and off from the surface of the disk 2.

When the spindle motor assembly has the construction described above, it becomes possible to use part of the space in which are disposed driving coils 9 as the passage in which is displaced the magnetic head 11. In addition, the spindle is fitted into the large-diameter bearing 3. Thus, the disk drive device can be made thin in size.

Next referring to FIGS. 7-9, a second embodiment of the present invention will be described in detail below.

In addition to the disk drive motor assembly described above in the first embodiment, the second embodiment has a means for balancing the attractive forces of the driving magnets 7 with respect to the stator 10. When the balance of the attractive forces is distorted, the rotor 6 is inclined in the direction in which the attractive force is greater so that both the parallelism between the rotor 6 and the spindle 5 and the precision of rotation are degraded. As a result, the sliding contact of the magnetic head 11 and the surface of the disk 2 is adversely affected so that in the case of writing and reading the data, errors result. The balance between the attractive forces acting on the rotor 6 is measured at both ends of the rotor in opposing relationship through the bearing 3 and it is preferable that the results of the measurements are that a degree of unbalance is no in excess of 20%.

Figure 7:
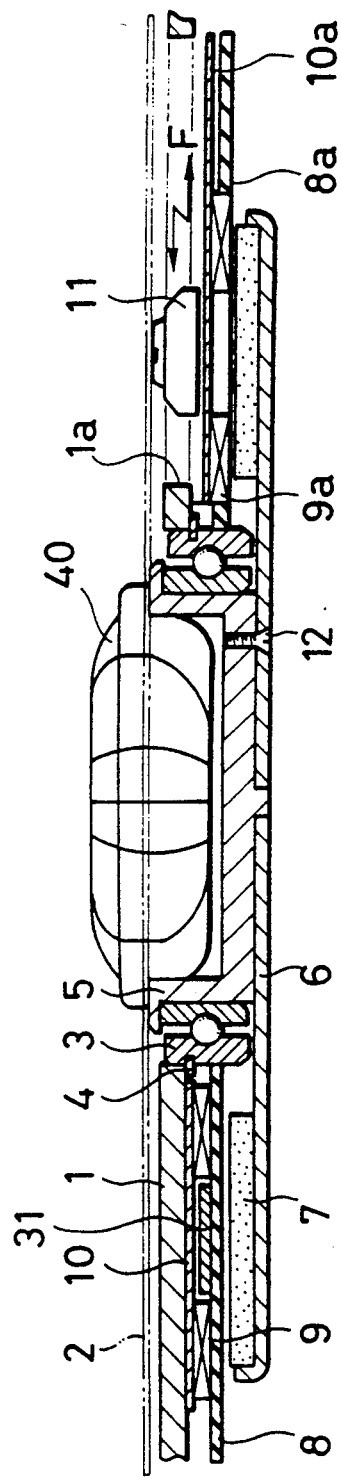
FIGS. 7 and 8 are side sectional views showing still another embodiment of the present invention.

Still referring to FIG. 7, a yoke 31 made of a magnetic material is disposed on the printed-circuit board 8 at least one portion of the spaces within a plurality of driving coils 9 which opposes to the recess 10a of the stator 10 across the bearing 3, thereby balancing the attractive forces of the driving magnets 7.

Figure 8:
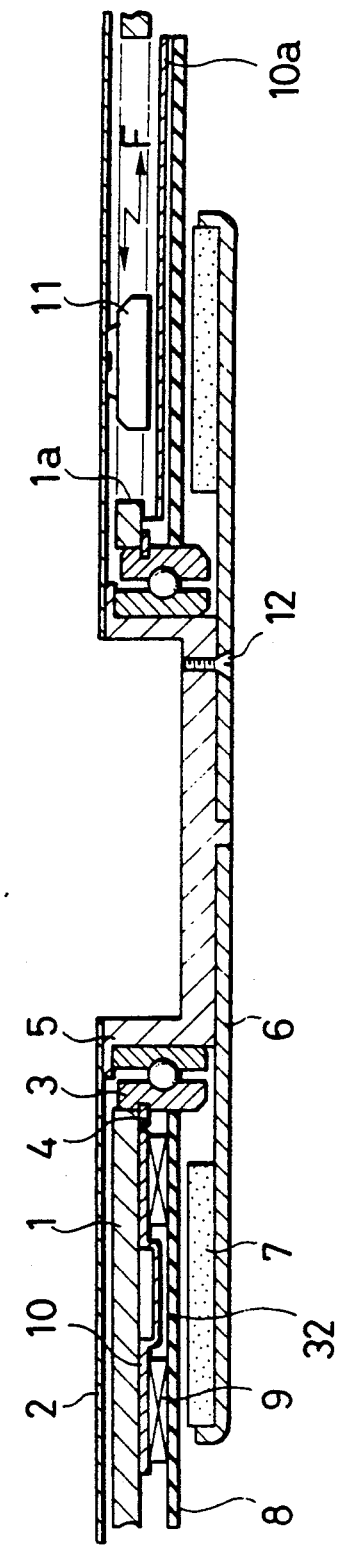

In stead of the provision of the yoke 31, as shown in FIGS. 8 and 9, the stator 10 may be subjected to the reduction press to form second recesses 32 as in the case of the recess 10 which are extended into the inner sides of the driving coils 9.

Next referring to FIGS. 10-14, an embodiment of the present invention applied to a 5.25" FDD will be described below.

Figure 11:
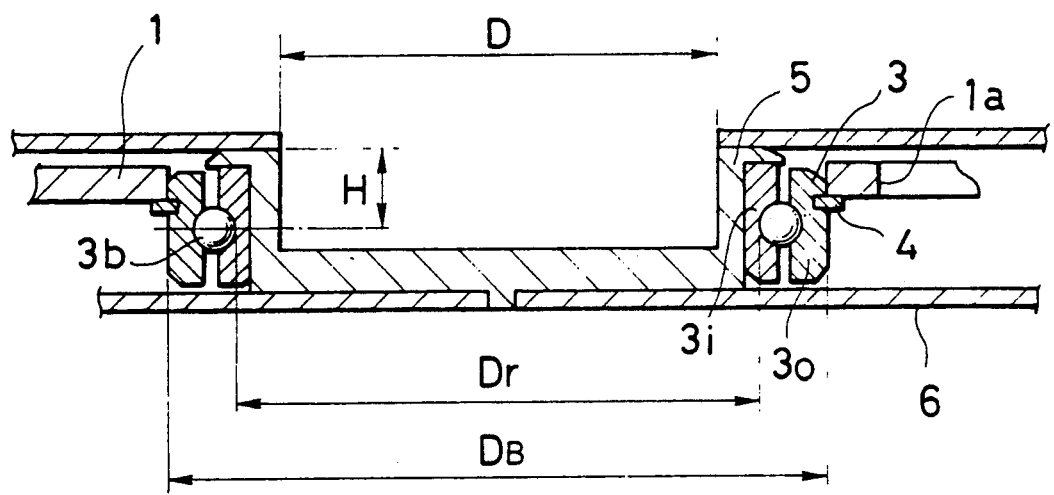
FIG. 11 is a side sectional view, on an enlarged scale, illustrating the sizes of the bearing assembly of FIG. 10.
Figure 12:
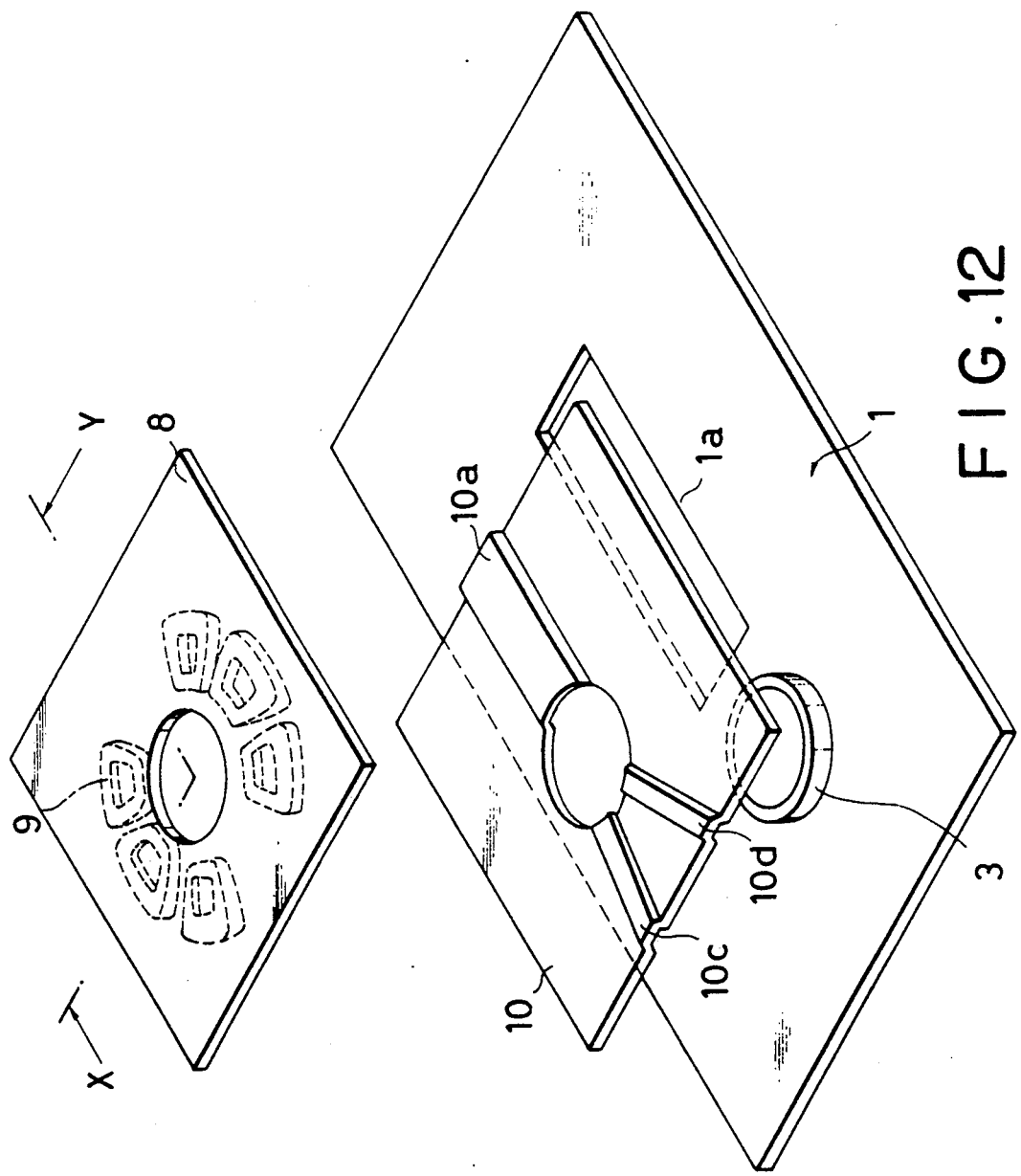
FIG. 12 is an exploded sectional view, viewed from the bottom of the emobodiment of FIG. 10.

As shown in FIGS. 10-11, the inner diameter of the inner ring $3_i$ of a large-diameter radial bearing 3 is greater than that of the disk 2 and the spindle 5 having the diameter substantially equal to that of the inner diameter D of the disk 2 is fitted into the inner ring $3_i$.

With this construction, the attractive forces of the driving magnets 7 are determined to become considerably greater than the clamping force of the center cone 40 (for instance, attractive forces − clamping force > 300 g). The attractive forces impart the upward pressure to the bearing 3 so that the stabilization can be attained.

Recesses 10c and 10d are formed on the opposite side of the recess 10a of the stator 10 across the bearing 3 so that the attractive forces are balanced and the cogging due to non-uniformity of torque can be decreased. The recesses 10c and 10d will be described in more detail in the following embodiments.

The driving coils 9 are arranged in a manner substantially similar to that described above with reference to FIG. 14 and the recess 10a of the stator 10 is inserted into the space 15 and recesses 10c and 10d, into the space 16. As shown in FIG. 13, the magnet assembly 7 consists of 12 alternately magnetized poles. In general the conventional three-phase full-wave drive includes 9 driving coils, but according to the present embodiment, 6 driving coils are used as shown in FIG. 14. When each phase is uniformly eliminated, the smoothness of torque is not lost.

In the case of a 5.25" FDD, the diameter $D_B$ of the outer ring $3_o$ of the bearing 3 is preferably smaller than the radius of 34.13 $_{mm}$ of the 79-th track of one surface of the disk which is the innermost position of the magnetic head 11. Therefore when $D_B > 68_{mm}$, the interference between the bearing 3 and the magnetic head 11 can be prevented and they can be arranged in series in coplanar relationship with each other.

When the diameter Dr of the raceway surface of the inner ring $3_i$ of the radial bearing 3 is greater than the inner diameter D ($\phi 28.57 \pm 0.025_{mm}$) of the disk 2, the diameter Dr of the raceway surface of the inner ring 3 becomes almost greater than the diameter of the points on which forces act so that when even one bearing is used, the stabilized precision of rotation can be ensured.

Furthermore, the lower the height H from the center of bearing balls 3b to the disk 2, the smaller the surface vibration of the spindle assembly and the vibration of the spindle become and the thinner the disk drive becomes.

The present invention has taken the thickness of the motor assembly and the size of the center cone 40 required for clamping the disk 2 into consideration. The result is that $H < 6_{mm}$ is considered to be effective.

In addition when the inner diameter of the radial bearing $\geq$ the inner diameter of a recording medium or disk 2, a spindle made of a material such as aluminum, an aluminum alloy, stainless steel, brass, zinc, a zinc alloy or the like and a filler and having a low coefficient of thermal expansion can be fitted into the inner ring. Thus, the standard bearings can be used and the thickness of the spindle and the thickness of the bearing are not cumulated in the vertical direction, whereby the FDD can be made thinner.

Referring next to FIG. 15, an embodiment of the present invention in which the inner ring itself of the bearing is used as spindle will be described.

In FIG. 15, the inner diameter 50a of the inner ring of a large-diameter radial bearing 50 is made substantially equal to the inner diameter of the disk 2. In addition, the inner ring is formed with a tapered portion 50b in order to guide the disk 2. Therefore the inner ring has the function of the spindle such as centering of the disk 2 and rotating the same. The periphery of the center hole of the rotor 51 is bent by the press forming process as indicated by 51a and securely fitted into the inner hole 50a of the bearing 50.

So far in the above-described embodiments of the present invention, the motor has been described as the surface opposing type DC brushless motor, but it is apparent that the belt drive can be used. In the latter case, the rotor 6 or 51 is replaced by a pulley. Even in this case, the stabilized rotation can be ensured because the inner ring is pressed in one direction under the force of the clamping force of the center cone 40 and the diameter of the raceway surface of the inner ring of the bearing is greater than the inner diameter of the recording medium or the disk.

Next an embodiment in which cogging torque resulting from the recess 10a of the embodiments described above with reference to FIGS. 2-9 can be cancelled will be described. Same reference numerals are used to designate similar parts in the following figures and the figures used to explain the above described embodiments so that no further explanation of the parts already made will not be repeated in this specification. However, in the fifth embodiment, in order to distinguish between the driving coils and their phases, reference numerals 91U, 91V, 91W, 92U, 92V and 92W are used in to indicate the driving coils.

First referring to FIG. 16, the construction of the spindle motor assembly of the disk drive device will be described. Parts which have not shown in FIG. 4 and are component parts of the spindle motor assembly are Hall elements 13a and 13b for detecting the phase of rotation of the driving magnets 7. Furthermore, a head carriage 14 for mounting thereon the magnetic head 11 and displacing the same is shown. As described above, in order to secure the space in which the head carriage 14 can be displaced, the chassis 1 is formed with the elongated rectangular opening 1a. The difference in construction of the fifth embodiment shown in FIG. 16 and the embodiment described above with reference to FIGS. 4-6 is as follows.

(1) the shape of the stator 10,
(2) the number of magnetized poles of the driving magnet assembly 7 and
(3) the number, arrangement and size of the driving coils.

These differences will be described in more detail below.

First referring to FIGS. 16-18, the shape of the stator 10 will be described. The stator 10 is in the form of a disk. In order to secure the space in which the magnetic head can be displaced in the radial direction of the disk 2, the rectangular recess 10a extended in the radial direction of the stator 10 is formed by the drawing operation by the machine press as in the case of the above-described embodiments, but according to the fifth embodiment, in addition to the recess 10a, the stator 10 is formed with a second recess 10b in order to cancel the clogging torque resulting from the recess 10a. The rectangular recess 10b is extended in the radial direction different from that of the recess 10a, but it is similar in cross section to the recess 10a; that is, both have the same trapezoidal cross section. Furthermore, both the recesses 10a and 10b have the same width L and depth D.

Figure 16:
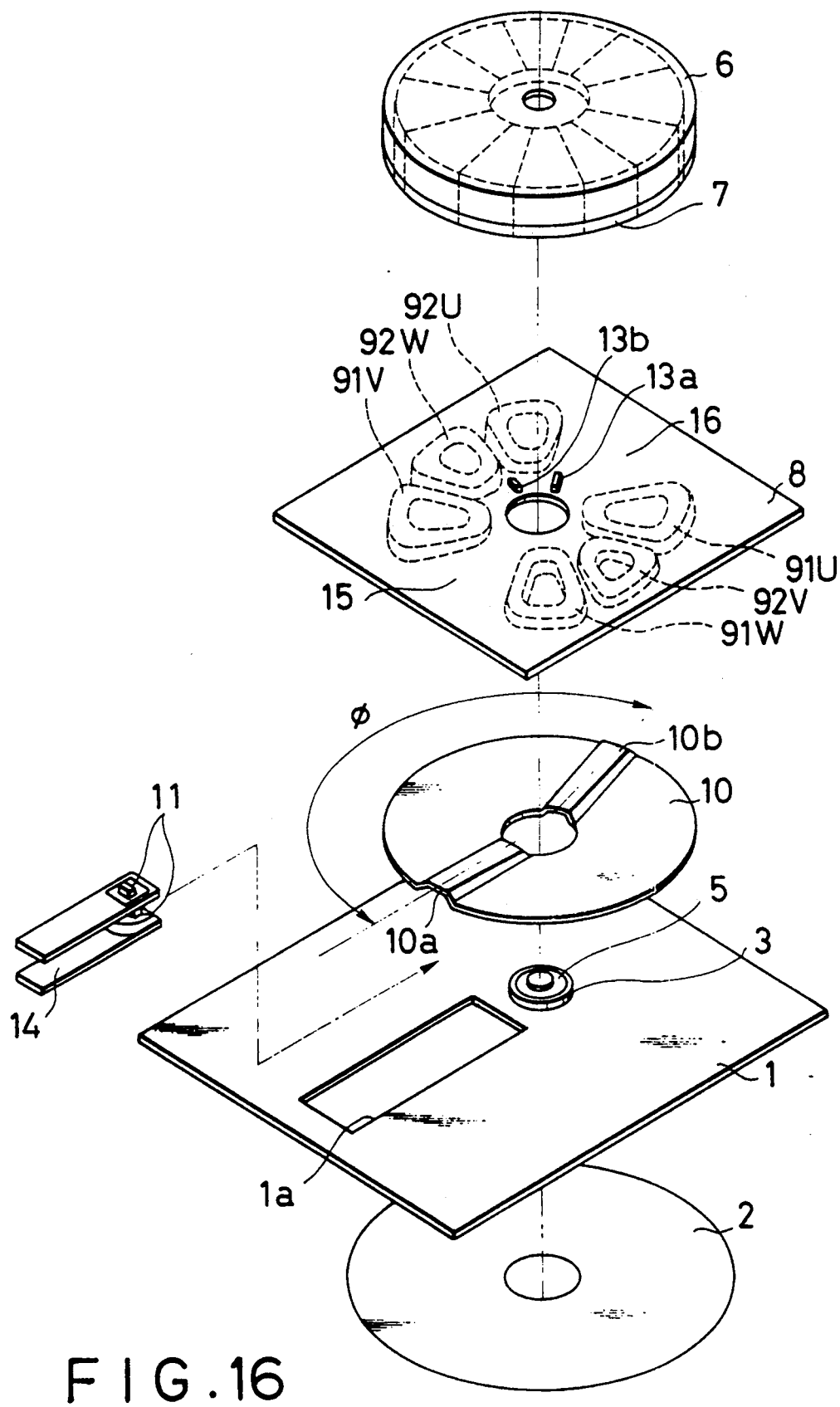
FIG. 16 is an exploded perspective view showing a disk drive motor assembly of an embodiment of the present invention.
Figures 17, 18:
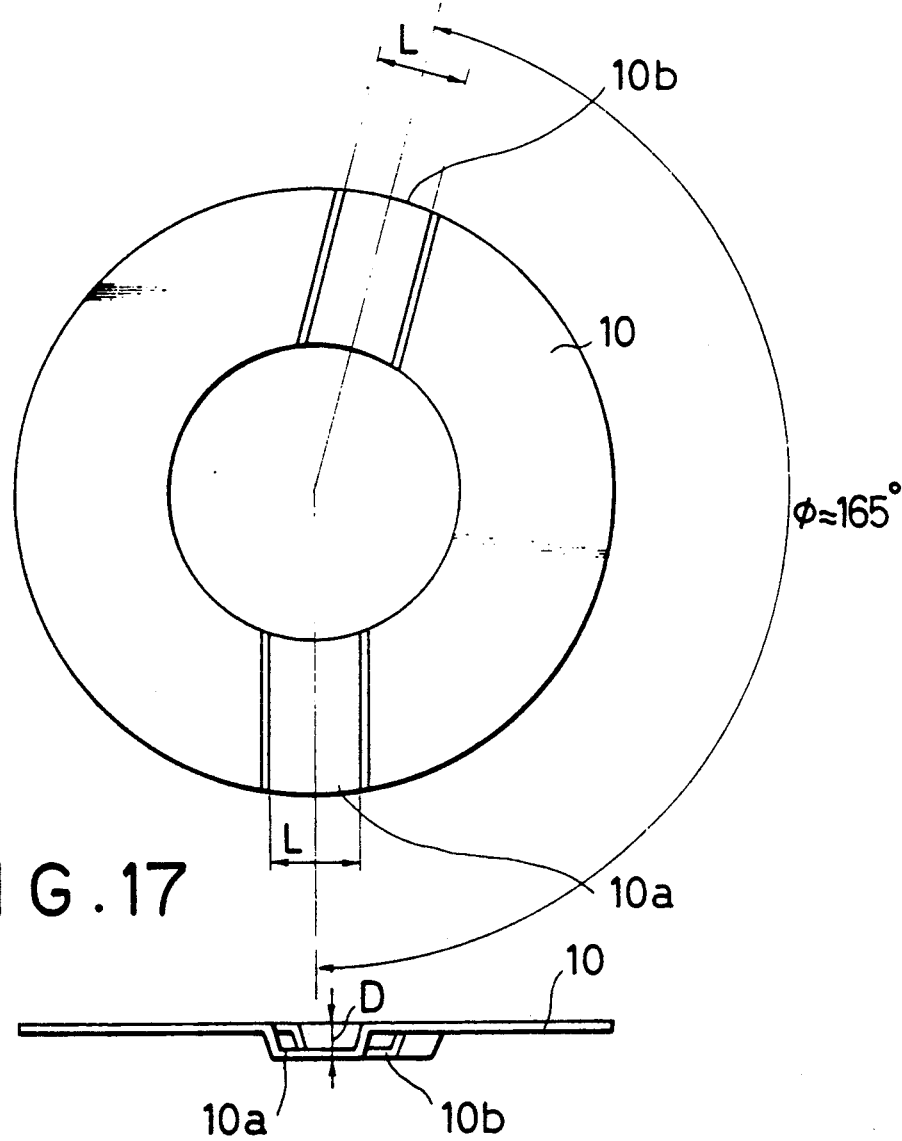
FIG. 17 is a top view showing a stator of FIG. 16.
FIG. 18 is a side view showing a stator of FIG. 16.

The positional relationship between the recesses 10a and 10b is determined by the angle $\phi$ between the recesses 10a and 10b as shown in FIGS. 16 and 17. In this case, the angle $\phi$ is determined as follows. That is, the whole circle of 360 degrees of the driving magnet assembly is equiangularly divided by a predetermined angle $\theta_o$ into an even number of alternately magnetized poles. The angle $\phi$ is then determined depending upon the center angle $\theta$ of each magnetized pole. When the number of poles is represented by P, the center angle of each magnetized pole is obtained by $2\pi/P$ (rad). The angle $\phi$ between the recesses 10a and 10b is obtained by the following equation:

$$\phi \approx (2\pi/P)(n+\alpha) \text{ rad}$$

where
n is 0 or any other integer, and
$\alpha$ is $\frac{1}{4}$, $\frac{1}{2}$ or $\frac{3}{4}$ as an optimum value selected in response to the dependability of the cogging torque on the rotational speed. However, in order to balance among the attractive forces of the driving magnets 7 as better as possible, it is preferable that the angle $\phi$ is as closer as possible to 180 degrees.

Figure 19:
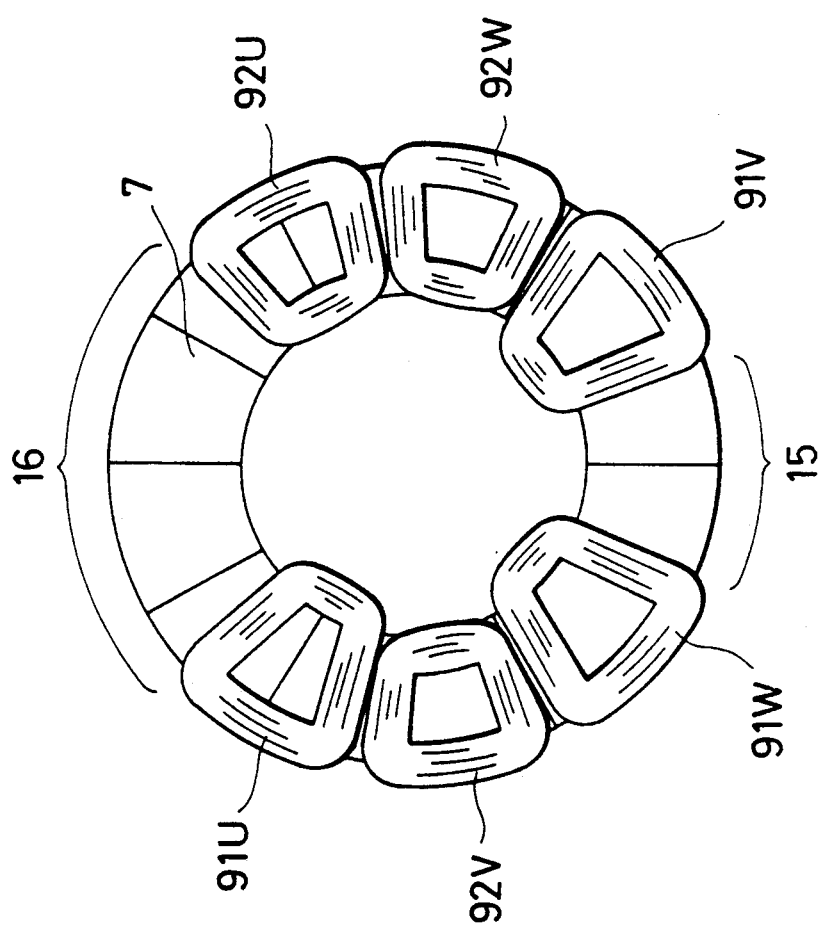
FIG. 19 is a top view showing an arrangement of the driving coils thereof.

The number of poles of the driving magnet assembly 7 is not limited, but the magnitude of torque obtained and the width of the recess 10a for permitting the displacement of the magnetic head 11 are taken into consideration so that in the fifth embodiment the number is selected 12 as shown in FIGS. 16 and 19. Furthermore the period of the cogging torque is selected by selecting the value of $\alpha = \frac{1}{2}$ by taking the above-mentioned angle $\theta_o$ into consideration. In view of the above, the angle $\phi$ between recesses 10a and 10b in this embodiment is determined as follows:

$$\phi \approx (2\pi/12)(5+\frac{1}{2}) = 165 \text{ degrees.}$$

Next the number and arrangement of the driving coils will be described. Since the driving magnetic assembly 7 consists of 12 poles, in the case of the three-phase Hall motor, as many as nine driving coils can be used in priniciple, but in the fifth embodiment, the recesses 10a and 10b are provided so that as shown in FIG. 19, the space 15 corresponding to one driving coil and the space 16 corresponding to two driving coils are defined in order to prevent the interference between the recesses 10a and 10b of the stator 10 and the driving coils. As a result, the whole number of six driving coils 91 and 92 are arranged in the form of two arcs which have the same center of a circle. In this case, it is seen that the spaces 15 and 16 are in opposing relationship with each other and the recesses 10a and 10b are positioned in the spaces 15 and 16, respectively.

Furthermore, as shown in FIG. 19, 6 driving coils are divided into two types depending on the size and the effective length for producing torque. the driving coils 91U, 91V and 91W have a longer length capable of producing torque greater than that produced by the other type driving coils 92U, 92V and 92W. In order to dispose on the printed-circuit board 8 the Hall elements 17a and 17b for detecting the phase of rotation of the driving magnet assembly 7 radially inwardly of the driving coils, the driving coils 92W and 92U have the shorter effective length. The driving coil 92V is substantially similar in size to the driving coils 92U and 92W so that the output torque obtained from the phase U,V and W becomes equal. The output torque in the U phase is the sum of torque produced by the coils 91U and 92U; the output torque by the V phase, the sum of the torque produced by the coils 91V and 92V; and the output torque by the W phase, the sum of the torque produced by the coils 91W and 92W.

According to the construction of the spindle motor of the fifth embodiment described above, the cogging torque produced by the recess 10a of the stator 10 can be cancelled by the cogging torque produced by the recess 10b as will be described in detail below with reference to FIGS. 20 and 21.

Figure 20:
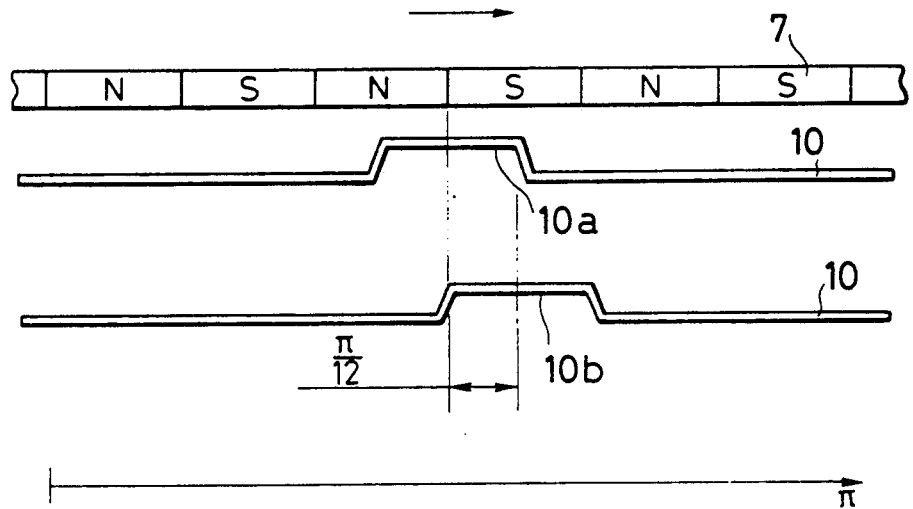
FIG. 20 is a view used to explain the positional relationship between a first recess and a second recess on the one hand and the magnetic poles of the driving magnets on the other hand in the motor thereof.

First, the FIG. 20 illustrates the positional relationship between the poles of the driving magnet assembly 7 and the recesses 10a and 10b of the stator 10. In FIGS. 16 and 17, the recesses 10a and 10b are shown as being angularly spaced about 165 degrees. This fact is same with the fact that they are angularly spaced apart from each other by $\pi/12$ (rad)=15 degrees from the standpoint of the phase of rotation of the driving magnet assembly 7.

Figure 21:
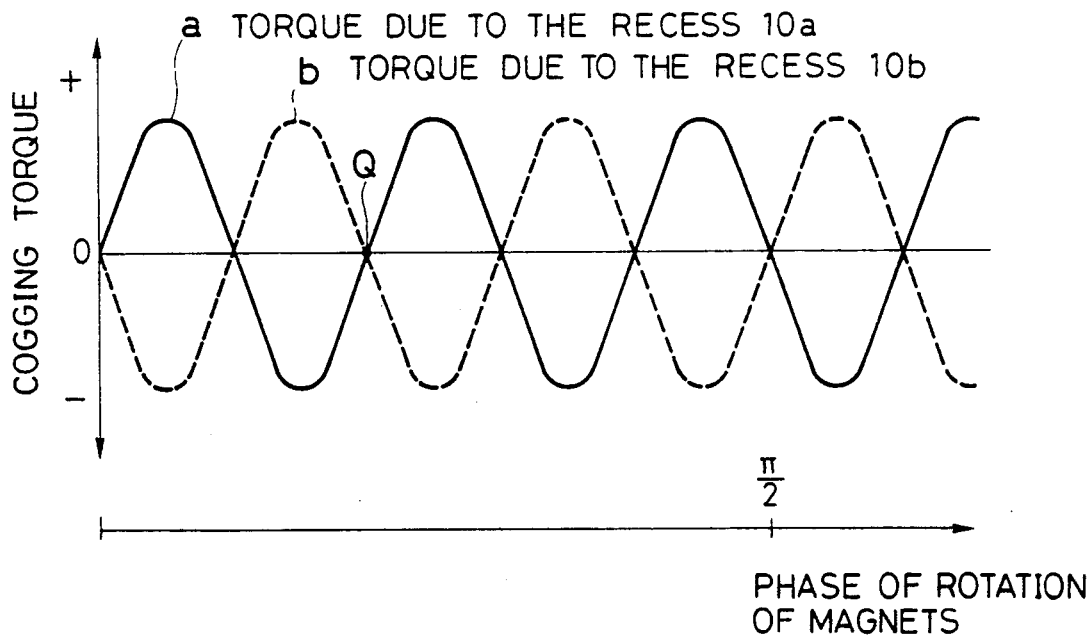
FIG. 21 is a diagram illustrating the cancellation of the cogging torque of the motor.

When the driving magnet 7 rotates in the direction indicated by the arrow in FIG. 20, because of the existence of the recess 10a, the driving magnet assembly 7 is subjected to the cogging torque which varies in a manner substantially similar to the sine wave as indicated by the solid line a as shown in FIG. 21, in which the positive (+) torque acts in the direction of the rotation while the negative (−) torque acts in the direction opposite to the direction of rotation. The phase of rotation shown in FIG. 20 is that at the point Q in FIG. 21.

On the other hand, because of the presence of the recess 10b, the driving magnet assembly 7 receives the cogging torque which varies in a manner substantially similar to the sine wave as indicated by the broken line b. Both the cogging torque is naturally same in frequency and strength. From the standpoint of the phase of rotation of the driving magnet assembly 7, the recesses 10a and 10b are angularly spaced apart from each other by 15 degrees, which is one half of the center angle 30 degrees of one pole of the driving magnet assembly 7 so that the phase of the cogging torque b is deviated from the phase of the cogging torque a by one half of the period of the torque variation. As is apparent from FIG. 21, the cogging torque a is cancelled by the cogging torque b.

Figure 24A:
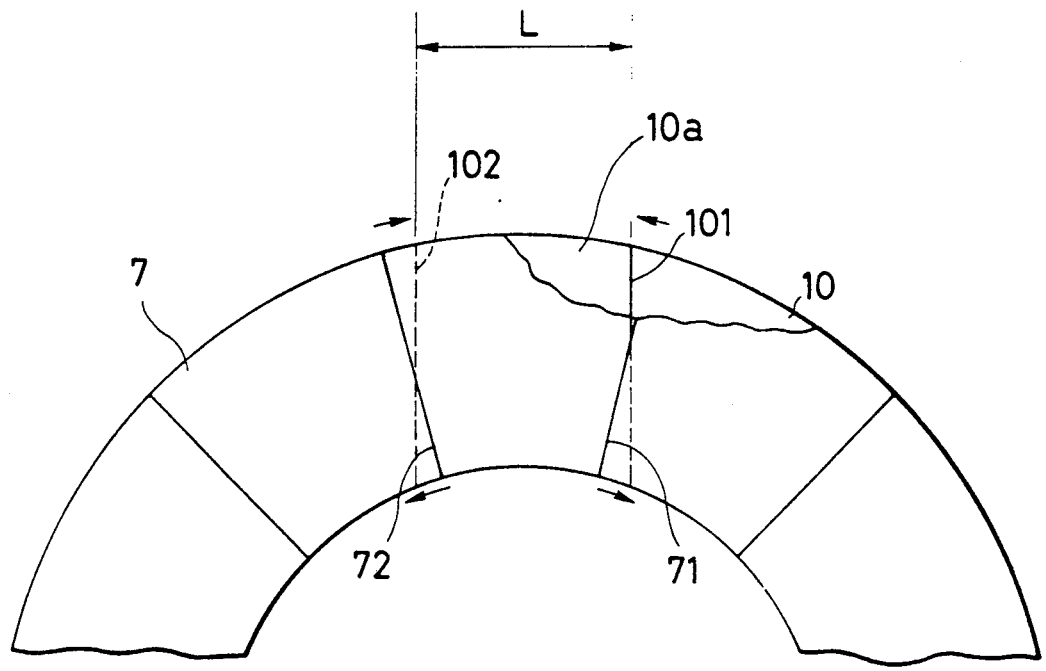
FIGS. 24A and 24B are views used to explain the difference in operation due to the difference in shape of the recesses of the stators, respectively.
Figure 24B:
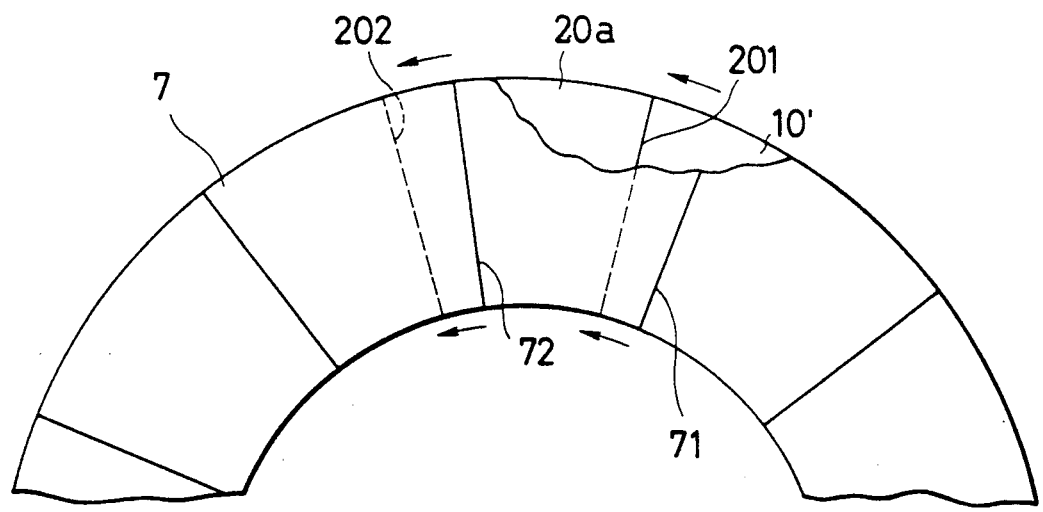

Next referring to FIGS. 24A, 24B and FIG. 25, operation according to the shape of the recess 10a of the stator 10 will be described and this description also applies to the recess 10b in common. FIG. 24A shows the present invention: that is, the stator 10 with the substantially rectangular recessed 10a and the driving magnet assembly 7 while FIG. 24B shows a comparative example; that is, a stator 10' having a fan-shaped recess 20a whose central angle is substantially equal to that of each pole of said driving magnet assembly. The direction and strength of the torque are determined by the positional relationship between the side edges 101, 102, 201 and 202 of the recesses 10a and 20a extended in the outward direction of the disks 10 and 10', respectively, and the boundary lines 71 and 72 of each pole of the driving magnet assembly 7.

According to the fifth embodiment of the present invention, when the stator 10 is viewed from a position on the line perpendicular to the surface of the stator 10 and when the side edges 101 and 102 of the recess 10a are in opposing relationship with the boundary lines 71 and 72 of the pole of the driving magnet assembly 7, they are not parallel with each other. As a result, the direction of the torque inside of the circle is opposite to the direction of the torque outside of the circle as shown by the arrows so that the cogging torque is cancelled by each other.

On the other hand, in the case of the comparative example, as shown in FIG. 24B, the side edges 201 and 202 of the recess 20a are substantially in parallel with the boundary lines 71 and 72 of the pole of the magnetic drive system 7. as a result, the directions of the torque inside and outside of the circle are same so that the torque strength is increased.

Figure 25:
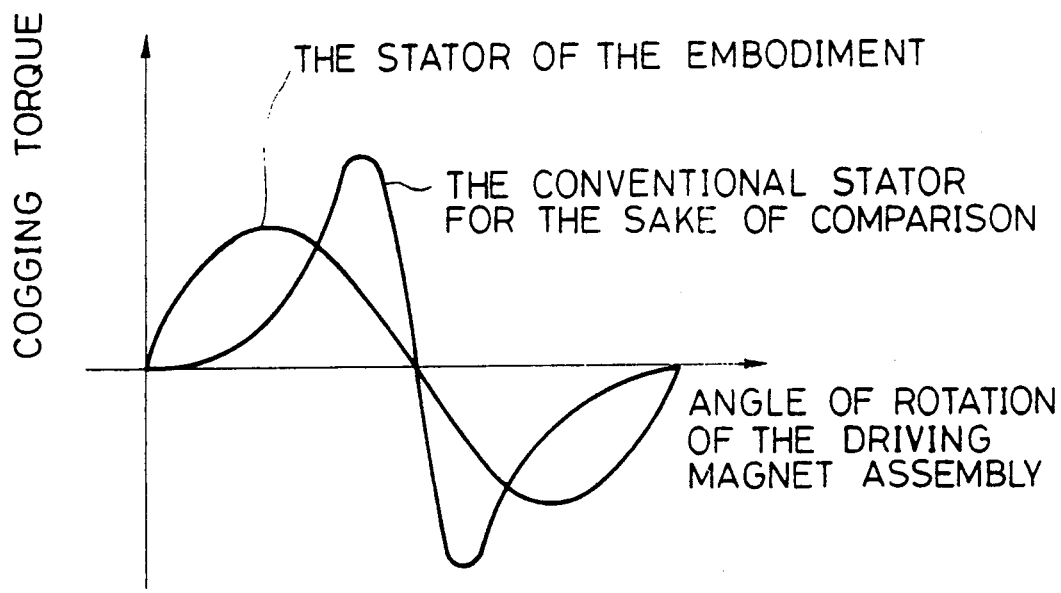
FIG. 25 is a diagram illustrating angle dependence characteristics of the clogging torque in response to an angle of rotation of a driving magnet assembly.

FIG. 25 illustrates angle dependence characteristics of the cogging torque of the angle of rotation of the driving magnet assembly 7 of the present embodiment shown in FIG. 24A and the comparative example showing FIG. 24B, respectively. It is seen that the stator with the recess 10a in accordance with the present invention has the smaller cogging torque which is substantially similar the sine wave so that the angle dependence characteristics thereof makes it easy to cancel the cogging torque.

As described above, the cogging torque is determined by the positional relationship between the side edges of the recess 10a and the boundary lines of each pole of the driving magnet assembly 7 so that when the width L of the recess 10a shown in FIG. 24A is selected properly, it becomes possible to obtain the cogging torque whose amplitude of oscillation is less and which is substantially similar in shape to a sine wave. The recess 10a is substantially in the form of a rectangle but the shape of the recess 10a may be an inverted shape of each pole of the driving magnet assembly 7.

As described above, in the case of the spindle motor of the fifth embodiment of the present invention, the cogging torque can be cancelled or made negligible so that the torque ripples are decreased, the precision of rotation can be considerably improved and the starting torque can be increased.

Furthermore, the angle $\phi$ between the recesses 10a and 10b of the stator 10 is selected substantially equal or closer to 180 degrees so that the attractive forces of the driving magnet assembly 7 can be substantially balanced so that a couple of forces acting on the center cone 40 and the bearing 3 can be decreased. As a result, the clamping of the disk can be ensured. In addition, the pressure previously applied to the bearing 3 can be also balanced so that the degradation of the bearing 3 can be prevented.

Moreover, the effective length of the driving coil is lengthened as long as practical and the two types of the driving coils different in size are so combined that the degree of torque at each phase can be made equal, whereby the output torque can be increased.

Figure 22:
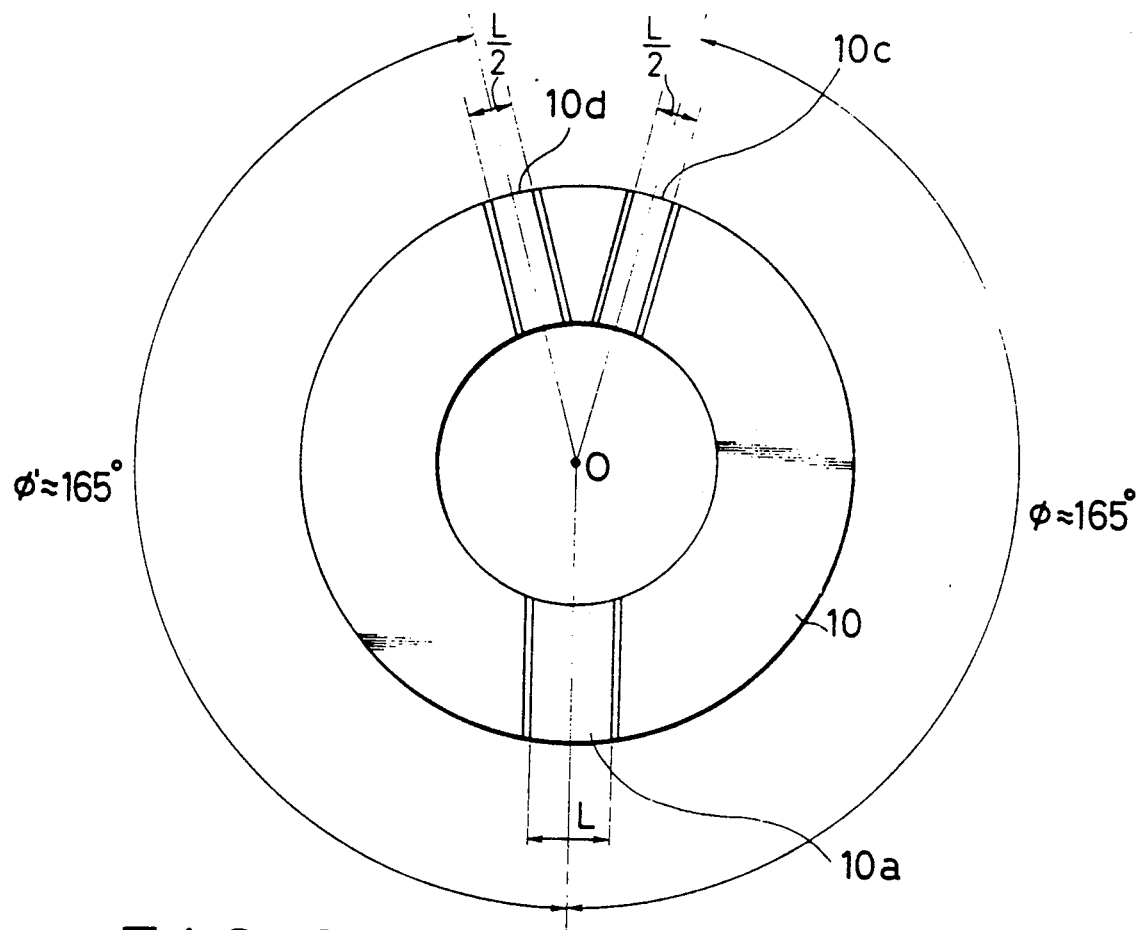
FIGS. 22 and 23 are a top view and a side view of another embodiment of the present invention, respectively.
Figure 23:
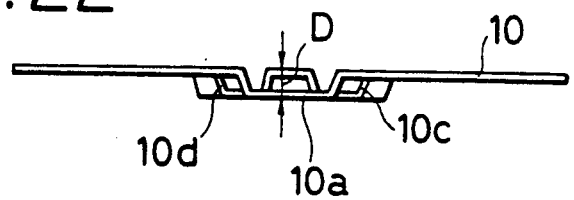

As described above, the construction according to the fith embodiment of the present invention leaves some unbalanced attractive forces of the driving magnet assembly 7. In order to solve this problem, it is preferable to use the stator shown in FIGS. 12, 22 or 23.

In the sixth embodiment, the provision of the recess 10a of the stator 10 for securing the space in which the magnetic head can be displaced is substantially similar to those shown in the above described embodiments, but two more recesses 10c and 10d are defined in order to cancel the cogging torque. They are substantially in the form of an elongated rectangle extended in the radial direction and are same in depth with the recess 10a, but their width is one half L/2. The angle $\phi$ between the recesses 10a and 10b and the angle $\phi'$ between the recesses 10a and 10d are substantially equal to 165 degrees.

With this construction, when the attractive force of the recess 10a due to the driving magnet assembly 7 is represented by Fa, the attractive forces Fc and Fd of the recesses 10c and 10d are expressed by the following equation:

$$Fc = Fd = (\tfrac{1}{2})Fa.$$

It follows therefore that the moment Fm of the attractive force of the driving magnet assembly 7 acting in the direction perpendicular to the stator 10 as the center point Q as a pivot point can be expressed by the following equation:

$$Fm = Fa - (FC + Fd) = 0$$

As a result, the attractive forces are balanced.

As described above, according to the sixth embodiment of the present invention, the attractive force between the driving magnet assembly 7 and the stator 10 can be balanced so that the inclination of the spindle 5 and the bearing 3 due to the unbalanced attrative forces can be prevented.

Next from the standpoint of the cogging torque, when the angle of rotation of the driving magnet assembly 7 is represented by $\theta$ (rad), the cogging torque Ta of the recess is expressed by the following equation:

$$Ta = \tau_0 \sin(12\theta)$$

where $\tau_0$ is amplitude of cogging torque. The cogging torque Tc and Td of the recessed 10c and 10d, respectively, are represented by $$Tc = (\tau_0/2) \sin\{12(\theta + 2\pi/12 \times 5.5)\} = -(\tau_0/2)\sin(12\theta), \text{ and}$$

$$Td = (\tau_0/2) \sin\{12(\theta - 2\pi/12 \times 5.5)\} = -(\tau_0/2)\sin(12\theta)$$

It follows therefore that the whole cogging torque Ttotal is expressed by $$\begin{aligned}T_{total} &= Ta + Tc + Td \\ &= (\tau_0 - \tau_0/2 - \tau_0/2)\sin(12\theta) \\ &= 0\end{aligned}$$

Therefore the cogging torque can be cancelled.

It is to be understood that the present invention is no limited to FDDs of the type described above and that it may be equally applied to other disk drive systems.

The invention has been described in detail with respect to preferred embodiments, and it will now be apparent from the foregoing to those skilled in the art that changes and modifications may be made without departing from the invention in its broader aspects, and it is the invention, therefore, in the appended claims to cover all such changes and modifications as fall within the true spirit of the invention.

What is claimed is:

1. A disk drive device of the type comprising:
    a spindle rotatably supported by a chassis on which is to be mounted a disk;
    a head disposed on said chassis so as to be movable in the radial direction of said disk;
    a rotor yoke securely mounted on said spindle and securely carrying a disk-shaped driving magnet assembly;
    a printed-circuit board disposed in opposing relationship with said driving magnet assembly and provided with a plurality of driving coils; and a stator yoke mounted on said chassis in opposing relationship with said driving magnet assembly through said plurality of driving coils, wherein said chassis has an opening for housing therein said head;
    said stator yoke has a recess in a portion corresponding to a region in which said head is displaced;
    said printed circuit board has an opening in opposing relationship with said recess; and
    at least one driving coil is disposed in said opening.

2. A disk drive device as claimed in claim 1, wherein said recess is a rectangular groove formed by the drawing operation and having the same width throughout the whole length of said groove.

3. A disk drive device as claimed in claim 1 further comprising a radial bearing, including an inner ring, interposed between said chassis and said spindle for rotatably supporting said spindle, said radial bearing having an inner diameter which is greater than that of said spindle, said spindle being fitted into an opening defined by the inner ring of said radial bearing.

4. A disk drive device as claimed in claim 3, wherein said recess is a rectangular groove formed by the drawing operation and having the same width throughout the whole length of said groove.

5. A disk drive device of the type having a spindle rotatably supported by a chassis on which is to be mounted a disk, a head disposed on said chassis so as to be movable in the radial direction of said disk, a rotary yoke securely mounted on said spindle and securely carrying a circular driving magnet assembly, a plurality of driving coils disposed in opposing relationship with said circular driving magnet assembly, and a stator yoke disposed on said chassis in opposing relationship with said circular driving magnet assembly through said plurality of driving coils; wherein the improvement comprises:
    said chassis having an opening in which said head is housed;
    said stator yoke having a recess in a portion corresponding to a region in which said head is displaced;
    satisfying the condition P=4n+2, where P being the number of magnetized poles of said circular driving magnet assembly and 3n (n: plus integers) being the number of said driving magnetic coils; and
    said plurality of driving coils being arranged in the form of a circle leaving a space corresponding to said recess of said stator yoke.

6. A disk drive device as claimed in claim 5 further comprising a radial bearing, including an inner ring, interposed between said chassis and said spindle for rotatably supporting said spindle, said radial bearing having an inner diameter which is greater than that of said spindle, said spindle being fitted into an opening defined by the inner ring of said radial bearing.

7. A disk drive device as claimed in claim 6, wherein said recess is a rectangular groove formed by the drawing operation by the mechanical press and having the same width throughout the whole length of said groove.

8. A disk drive device of the type having a spindle which is rotatably supported through a bearing on a chassis and over which is mounted a disk;
   a head disposed on said chassis so as to be movable in the radial direction of said disk;
   a rotor yoke which is securely attached to said spindle and to which is attached a circular driving magnet ring;
   a plurality of driving coils disposed in opposing relationship with said circular driving magnet assembly; and a stator yoke disposed on said chassis in opposing relationship with said circular driving magnet assembly through said plurality of driving coils; wherein the improvement comprises:
   said chassis having an opening in which said head is housed;
   said stator yoke having a recess in a portion corresponding to a region in which said head is displaced; and means, disposed at a position in opposing relationship with said recess across said bearing, for balancing attractive forces of said circular driving magnet assembly acting on said stator yoke.

9. A disk drive device as claimed in claim 8, wherein said balancing means comprises another yoke members disposed within spaces of said driving coils.

10. A disk drive device as claimed in claim 8, wherein said balancing means is a second recess formed by the drawing operation.

11. A disk drive device as claimed in claim 10, wherein said second recess is extended into an inside space of one of said plurality of driving coils.

12. A disk drive device of the type having a spindle rotatably supported by a chassis on which is to be mounted a disk, a head disposed on said chassis so as to be movable in the radial direction of said disk, a rotary yoke securely mounted on said spindle and securely carrying a circular driving magnet assembly, a plurality of driving coils disposed in opposing relationship with said circular driving magnet assembly, and a stator yoke disposed on said chassis in opposing relationship with said circular driving magnet assembly through said plurality of driving coils; wherein the improvement comprises:
   said chassis having an opening in which said head is housed; and
   said stator yoke having a first recess formed in a portion corresponding to a region in which said head is displaced and a second recess formed so as to cancel the cogging torque produced by said first recess.

13. A disk drive device as claimed in claim 12, wherein said driving magnet assembly is equiangularly divided by a predetermined angle $\theta_0$ into an even number of alternately magnetized poles defined by driving by $\theta$ are positively and negatively;
   said first and second recesses of said stator yoke are substantially in the form of a rectangle and are extend in different radial directions, respectively, of said stator; and
   the side edges of said recesses extending outwardly of the stator yoke are not in parallel with boundary lines of the poles of said driving magnet assembly, when said side edges and said boundary lines become in opposing relationship, by viewing from a point of a line perpendicular to said surface of said stator yoke.

14. A disk drive device as claimed in claim 12, wherein an even number of poles defined by equiangularly dividing said circular driving magnet assembly by $\theta$ are alternately positively and negatively magnetized;
   said first and second recesses of said stator yoke are substantially in the form of a rectangle and are extended in the different radial directions, respectively, of said stator; and
   an angle between said first and second recesses is substantially equal to $(n+\alpha)$ times said predetermined angle $\theta_0$, wherein n is 0 or an integer, and $\alpha$ is $\frac{1}{4}$, $\frac{1}{2}$ or $\frac{3}{4}$.

15. A disk drive device as claimed in claim 13, wherein an even number of poles defined by equiangularly dividing said circular driving magnet assembly by $\theta$ are alternately positively and negatively magnetized;
   said first and second recesses of said stator yoke are substantially in the form of a rectangle and are extended in the different radial directions, respectively, of said stator; and
   an angle between said first and second recesses is substantially equal to $(n+\alpha)$ times said predetermined angle $\theta_0$, wherein n is 0 or an integer, and $\alpha$ is $\frac{1}{4}$, $\frac{1}{2}$ or $\frac{3}{4}$.

16. A disk drive device as claimed in claim 14, wherein the angle between said first and second recesses is 180 degrees plus $\frac{1}{4}$ or $\frac{1}{2}$ or $\frac{3}{4}$ of said angle $\theta$ or is 180 degrees minus $\frac{1}{4}$ or $\frac{1}{2}$ or $\frac{3}{4}$ of said angle $\theta_0$.

17. A disk drive device as claimed in claim 15, wherein the angle between said first and second recesses is 180 degrees plus $\frac{1}{4}$ or $\frac{1}{2}$ or $\frac{3}{4}$ of said angle $\theta$ or is 180 degrees minus $\frac{1}{4}$ or $\frac{1}{2}$ or $\frac{3}{4}$ of said angle $\theta_0$.

18. A disk drive device as claimed in claim 12, wherein said plurality of driving coils consists of a predetermined number of first driving coils and a predetermined number of second driving coils which are different in size from said first driving coils, each pair of said first and second coils being in the same phase; and
   said first and second driving coils are so interconnected that output torque in each phase becomes equal.

19. A disk drive device as claimed in claim 13, wherein said plurality of driving coils consists of a predetermined number of first driving coils and a predetermined number of second driving coils which are different in size from said first driving coils, each pair of said first and second coils being in the same phase; and
   said first and second driving coils are so interconnected that output torque in each phase becomes equal.

20. A disk drive device as claimed in claim 16, wherein said plurality of driving coils consists of a predetermined number of first driving coils and a predetermined number of second driving coils which are different in size from said first driving coils, each pair of said first and second coils being in the same phase; and
   said first and second driving coils are so interconnected that output torque in each phase becomes equal.

21. A disk drive device as claimed in claim 17, wherein said plurality of driving coils consists of a predetermined number of first driving coils and a predetermined number of second driving coils which are different in size from said first driving coils, each pair of said first and second coils being in the same phase; and said first and second driving coils are so interconnected that output torque in each phase becomes equal.

22. A disk drive device as claimed in claim 12, wherein said plurality of driving coils are arranged in the form of a circle leaving spaces so as not to interfere with said first and second recesses of said stator yoke, whereby said first and second recesses are positioned within said spaces, respectively.

23. A disk drive device as claimed in claim 13 wherein said plurality of driving coils are arranged in the form of a circle leaving spaces so as not to interfere with said first and second recesses of said stator yoke, whereby said first and second recesses are positioned within said spaces, respectively.

24. A disk drive device as claimed in claim 18 wherein said plurality of driving coils are arranged in the form of a circle leaving spaces so as not to interfere with said first and second recesses of said stator yoke, whereby said first and second recesses are positioned within said spaces, respectively.

25. A disk drive device as claimed in claim 19 wherein said plurality of driving coils in the form of a circle leaving spaces so as not to interfere with said first and second recesses of said stator yoke, whereby said first and second recesses are positioned within said spaces, respectively.

* * * * *